United States Patent
Nolan et al.

[11] Patent Number: 5,180,266
[45] Date of Patent: Jan. 19, 1993

[54] THREADED SHEET METAL DECORATIVE CAP

[75] Inventors: Christopher E. Nolan; Curtis M. Brown, both of Holland; Jeffrey T. DeVries, Wyoming, all of Mich.

[73] Assignee: Metal Flow Corporation, Holland, Mich.

[21] Appl. No.: 876,408

[22] Filed: Apr. 30, 1992

[51] Int. Cl.⁵ .................... F16B 37/14; B60B 1/00
[52] U.S. Cl. .................. 411/429; 411/431; 411/374; 411/910; 301/35.62
[58] Field of Search ............. 411/429–431, 411/372, 373, 374, 910; 301/9 DN

[56] References Cited

U.S. PATENT DOCUMENTS

| | | |
|---|---|---|
| Re. 30,121 | 10/1979 | Chaivre . |
| Re. 33,114 | 11/1989 | Chiavon . |
| 2,095,289 | 10/1937 | Rosenberg . |
| 3,364,806 | 1/1968 | Chaivre . |
| 3,548,704 | 12/1970 | Kutryk . |
| 3,585,900 | 6/1971 | Chaivre . |
| 4,015,503 | 4/1977 | Romano . |
| 4,018,133 | 4/1977 | Chaivre . |
| 4,143,578 | 3/1979 | Becker . |
| 4,400,123 | 8/1983 | Dunegan ............... 411/373 |
| 4,521,146 | 6/1985 | Wharton ................. 411/1 |
| 4,557,654 | 12/1985 | Masuda ................. 411/431 |
| 4,582,462 | 4/1986 | Thiel .................... 411/371 |
| 4,616,535 | 10/1986 | Chiavon ............. 411/429 X |
| 4,659,273 | 4/1987 | Dudley ................. 411/373 |
| 4,723,866 | 2/1988 | McCauley ........... 411/910 X |
| 4,764,070 | 8/1988 | Baltzell ................ 411/430 |
| 4,813,835 | 3/1989 | Toth .................... 411/429 |
| 4,824,305 | 4/1989 | McCauley ............ 411/431 |
| 4,968,202 | 11/1990 | Lanham ............... 411/431 |
| 5,048,898 | 9/1991 | Russell ................ 301/37 |
| 5,071,300 | 12/1991 | McCauley ............ 411/222 |

Primary Examiner—Neill R. Wilson
Attorney, Agent, or Firm—Price, Heneveld, Cooper, DeWitt & Litton

[57] ABSTRACT

A lug nut and dress cap that enables a standard sized lug wrench to be employed whether the cap is in place or lost, the cap having the same standard lug wrench size as the nut. The cap is a deep drawn element having a hollow hexagonal configuration adjacent its outer closed end and specially formed threads adjacent its inner open end that interlock with the cut machined threads of the lug nut. The cap threads have a curvilinear, radiused root and a curvilinear, radiused crest. The cap outer end extends beyond the lug nut. The middle or intermediate portion of the cap between the hexagonal outer end portion and the threaded inner end portion has a diameter larger than the diameter of the hexagonal portion of the cap and larger than the diameter of the hexagonal outer end of the lug nut.

13 Claims, 1 Drawing Sheet

THREADED SHEET METAL DECORATIVE CAP

BACKGROUND OF THE INVENTION

This invention relates to wheel lug nut caps and a lug nut and cap combination. In present technology for making and applying wheel lug nut decorative caps, the caps are fastened to the lug nut to be permanently secured thereto by welding, press fitting, or by curling flanges or other segments of the cap into grooves or slots on the lug nut. The cap is made to have an external size which is the finished hexagonal size to be received by a standard lug wrench socket, with the lug nut it covers being a substandard size These "permanently" attached caps can present later problems to the automobile owner. Specifically, if the cap becomes loose or falls off, as frequently occurs, the standard size lug wrench will not fit the substandard nut, making it very difficult to remove the uncapped lug nut. The tendency is for the lug wrench to slip on the nut, thereby rounding the corners of the substandard hex nut and making it even more difficult to remove. When the undersized lug nut is removed, a complete combination nut and cap must be used in its place. Another frequently encountered problem is the galvanic action causing rusting that occurs at the weld joint between the two different materials of the cover and the lug nut.

SUMMARY OF THE INVENTION

An object of this invention is to provide a novel lug nut dress cap forming a novel lug nut cap and nut combination that enables a standard sized lug wrench to be employed whether the cap is in place or lost. The cap has the same standard lug wrench size as the nut. The cap is a deep drawn element having a hollow hexagonal configuration adjacent its outer closed end for cooperation with a lug wrench for removal thereof The deep drawn cap has specially formed threads adjacent its inner open end, with a radiused curvilinear thread configuration that interlocks with the cut machined threads of the lug nut when combined. The cap threads have a curvilinear, radiused root and a curvilinear, radiused crest. The deep drawn cap outer end extends beyond the lug nut. The middle or intermediate portion of the cap between the hexagonal outer end portion and the threaded inner end portion has a diameter larger than the diameter of the hexagonal portion of the cap and larger than the diameter of the hexagonal outer end of the lug nut. The lug nut hexagonal portion is of the same size as the hexagonal outer end of the cap. The intermediate portion of the cup is preferably cylindrical. In the event of a lost cap, a new one can be easily and quickly attached without having to replace the lug nut.

The intermediate portion of the lug nut has machined, cut threads on the outer periphery for cooperation with the formed threads of the cap inner end. The inner end of the lug nut has a tapered portion to interfit with the vehicle wheel in conventional fashion The axial center of the lug nut is hollow, being threaded for attachment to the wheel stud.

These and several other objects, advantages and features of the invention will become apparent upon studying the following specification in conjunction with the drawings.

DESCRIPTION OF THE PREFERRED EMBODIMENT

Figure 1:
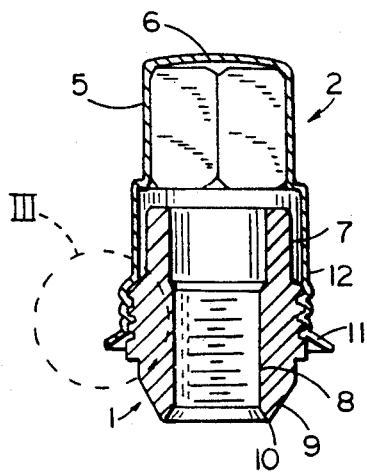
FIG. 1 is an elevational sectional view of the combination lug nut and lug nut cap taken on plane I—I of FIG. 2.
Figure 2:
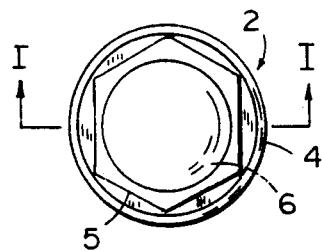
FIG. 2 is an end view of the combination in claim 1.
Figure 3:
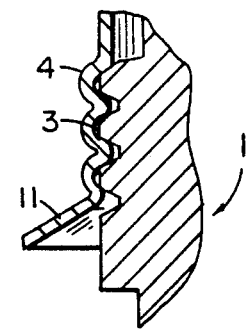
FIG. 3 is an enlarged, fragmentary, sectional view of a portion of the combination in FIG. 1.
Figure 4:
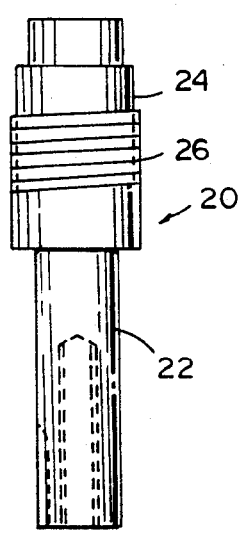
FIG. 4 is an elevational view of a roll arbor employable for forming the threads into the novel cap.
Figure 5:
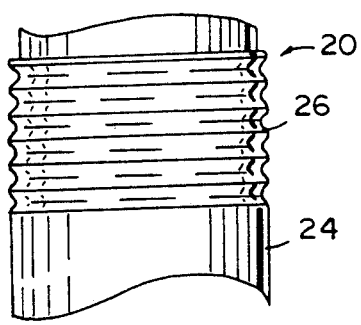
FIG. 5 is a fragmentary, enlarged view of a portion of the thread forming head of the roll arbor.
Figure 6:
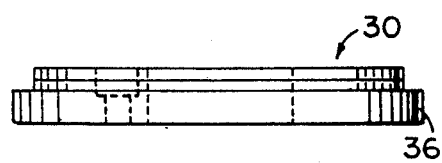
FIG. 6 is an elevational view of a threading roll to be used in combination with the roll arbor in FIG. 4 for forming the threads on the cap.
Figure 7:
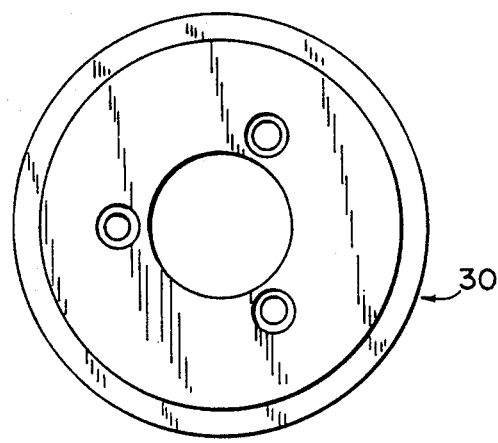
FIG. 7 is a plan view of the threading roll in FIG. 6.

Referring now specifically to the drawings, there is shown in FIGS. 1-3 a combination wheel lug nut and decorative cap, namely, lug nut 1 and cap 2 interconnected therewith. The steel lug nut inner end 9 has a soft taper to engage the cooperative surface on the vehicle wheel when the lug nut is threaded onto a conventional wheel stud (not shown). The inner end 10 of lug nut 1 has a lead in diameter equal to that of the seat angle. The lug nut has a central bore therethrough along its axis, this inner cylindrical wall of the bore being threaded at 8. The outer end portion 7 of lug nut 1 is of hexagonal configuration of standard lug wrench size Intermediate the ends and on the outer periphery of lug nut 1 are a plurality of machine cut threads 3, each having a pair of outer edges straddling a flat peripheral face (FIG. 3).

Lug nut cap 2 is elongated on its central axis which is coincident with the central axis of lug nut 1 when the two are combined The outer end portion 5 of cap 2 has a standard hexagonal configuration and size to be received by a standard lug wrench socket, equal to that of hexagonal outer end portion 7 of lug nut 1. Outer end 6 of the cap is closed while the opposite inner end of cap 2 is open to receive lug nut 1 On the inner end portion of cap 2 are formed threads 4 which have curvilinear, radiused roots and crests. Specifically, although the radius may vary somewhat, a curve radius of about 0.016 inch for both the root and the crest has been found to perform satisfactorily in cooperation with machine cut threads 3 such that, when the formed threads of the same pitch and lead angle as the cut threads are threadably interconnected, they will interlock and securely retain the cap. The inner end of cap 2 may also have an optional skirt or flare 11 to hide a portion of the lug nut otherwise visible between the cap and the wheel. The intermediate portion 12 of cap 2, between formed threads 4 and hexagonal end portion 5 has a length greater than the length of hexagonal portion 7 of lug nut 1, and a diameter greater than the maximum diameter of portion 7 to axially offset hexagonal portion 5 of cap 2 from hexagonal portion 7 of the nut. Preferably intermediate portion 12 is cylindrical The deep drawn cap has a length greater than that of the lug nut.

Figure 8:
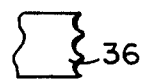
FIG. 8 is a fragmentary, enlarged view of a portion of the threading roll periphery.

The formed threads 4 on cap 2 are formed using a roll arbor 20 and threading roll 30. Roll arbor 20 includes an arbor 22 to be mounted in a chuck for rotation about its central axis. On its cylindrical head 24 is outer thread forming surface 26 having male and female portions to create a curvilinear radiused configuration of the size, pitch and lead angle desired in the final formed threads 4 of cap 2. This forming surface cooperates with a like configured female and male forming surface 36 (FIG. 8) on the outer periphery of threading roll 30 which rotates on its central axis offset from and parallel to roll arbor 20 in conventional fashion. The special configuration of the formed cap threads is provided for locking action with the shoulders of the cut threads of the lug nut, and also to render the thin cap material less susceptible to fracture when being formed.

The decorative cap may be formed of any of the materials commonly employed for such caps, with stainless steel being the most commonly used. Other potential materials are cold rolled steel with, for example, a black coating, brass with chrome plating, or aluminum anodized to a selected color.

In use of the combination, the lug nut 1 is first attached tot he wheel stud and secured tightly with a standard lug wrench. Then the decorative cap 2 is threaded onto the lug nut using the same standard lug wrench, the machined threads 3 biting into the formed threads 4 as the threads bottom out. Likewise, removal of the lug nut merely requires the operator to spin off cap 2 with the lug wrench socket, and then loosen lug nut 1 with the same lug wrench socket. If any of the lug nut caps become lost or damaged, they can be readily replaced without having to replace the entire combination lug nut and cap.

Various modifications of the preferred embodiment disclosed as illustrative of the invention, may be made within the scope of the concept presented, one such variation being elimination of skirt 11. Thus, it is not intended that the invention is to be limited tot he details of the embodiment set forth, but only by the scope of the appended claims and the reasonable equivalents thereto.

The embodiments of the invention in which an exclusive property or privilege is claimed are defined as follows:

1. A wheel lug nut and cap combination comprising:
   a lug nut having a length, a central axis, a threaded axial bore on said axis to engage a threaded wheel stud, a tapered inner end shoulder, a hexagonal outer end portion, and outer peripheral machine cut threads between said inner and outer ends, each said thread having a pair of edges;
   a lug nut cap cooperatively interfittable with said lug nut, being deep drawn to a length greater than said lug nut length; said cap having a hexagonal outer end portion equal in size to that of said lug nut outer end portion but axially offset from said lug nut hexagonal outer end portion and being closed on said outer end; said cap having an open inner end, an inner end portion, and formed peripheral threads on said inner end portion; said threads having a curvilinear, radiused root cross section, and a curvilinear, radiused crest cross section, and a pitch, spacing and lead angle compatible with the pitch, spacing and lead angle of said lug nut machine cut threads, to tightly interengage with said machine cut thread edges.

2. The wheel lug nut and cap combination in claim 1 wherein said cap inner end has a flared peripheral skirt.

3. The wheel lug nut and cap combination in claim 1 wherein said cap is of a different metal than said lug nut.

4. The wheel lug nut and cap combination in claim 3 wherein said lug nut is steel and said cap is one of the group consisting of stainless steel, cold, rolled steel, brass and aluminum.

5. A wheel lug nut and cap combination comprising:
   a lug nut having a length, a central axis, a threaded axial bore on said axis to engage a threaded wheel stud, a tapered inner end shoulder, a hexagonal outer end portion, and outer peripheral machine cut threads between said inner and outer ends;
   a deep drawn lug nut cap cooperatively interfittable with said lug nut, said cap having a hexagonal outer end portion equal in size to said lug nut hexagonal outer end portion, and axially offset from said lug nut hexagonal outer end portion;
   said cap having an open inner end, an inner end portion, and formed peripheral threads on said inner end portion;
   said threads having a curvilinear cross section and a pitch, spacing and lead angle compatible with the pitch, spacing and lead angle of said lug nut machine cut threads, to tightly interengage with said machine cut threads.

6. The wheel lug nut and cap combination in claim 5 wherein said cap has a length greater than the length of said lug nut.

7. The wheel lug nut and cap combination in claim 5 wherein said formed threads have a curvilinear root and a curvilinear crest.

8. The wheel lug nut and cap combination in claim 5 wherein said cap inner end has a flared peripheral skirt.

9. The wheel lug nut and cap combination in claim 5 wherein said cap is of a different metal than said lug nut.

10. A wheel lug nut cap cooperatively interfittable with a lug nut having a hexagonal outer end portion, machine cut peripheral threads and an open inner end;
    said lug nut cap being deep drawn to an elongated length having a central axis, a closed, hexagonal outer end portion, an intermediate portion of a diameter greater than the maximum diameter of said hexagonal outer end portion, an open inner end, and an inner end portion with formed peripheral threads;
    said threads having a curvilinear, radiused root cross section and a curvilinear, radiused crest cross section.

11. The wheel lug nut cap in claim 10 wherein said intermediate portion is cylindrical.

12. The wheel lug nut cap in claim 10 wherein said inner end has a flared skirt.

13. The wheel lug nut in claim 10 of one of the group consisting of stainless steel, cold, rolled steel, brass and aluminum.

* * * * *

UNITED STATES PATENT AND TRADEMARK OFFICE
CERTIFICATE OF CORRECTION

PATENT NO.   : 5,180,266

DATED        : January 19, 1993

INVENTOR(S)  : Christopher E. Nolan, Curtis M. Brown, Jeffrey T. DeVries

It is certified that error appears in the above-identified patent and that said Letters Patent is hereby corrected as shown below:

Column 1, line 15;
 After "size" insert -- . --;
Column 1, line 40;
 After "thereof" insert -- . --;
Column 1, line 54;
 "cup" should be -- cap --;
Column 1, line 62;
 After "fashion" insert -- . --;
Column 2, line 46;
 After "lug nut 1" insert -- . --;
Column 2, line 64;
 After "cylindrical" insert -- . --;
Column 3, line 21;
 "tot he" should be -- to the --;
Column 3, line 36;
 "tot he" should be -- to the --.

Signed and Sealed this

Fifteenth Day of March, 1994

Attest:

BRUCE LEHMAN

*Attesting Officer*  *Commissioner of Patents and Trademarks*